United States Patent
Rork et al.

(10) Patent No.: US 10,308,217 B2
(45) Date of Patent: Jun. 4, 2019

(54) METHOD AND APPARATUS FOR SECURE PAIRING

(71) Applicant: FORD GLOBAL TECHNOLOGIES, LLC, Dearborn, MI (US)

(72) Inventors: Joseph Paul Rork, Plymouth, MI (US); Matthew Atwood Whitaker, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 62 days.

(21) Appl. No.: 14/741,020

(22) Filed: Jun. 16, 2015

(65) Prior Publication Data

US 2016/0368454 A1 Dec. 22, 2016

(51) Int. Cl.
*B60R 25/24* (2013.01)
*G07C 9/00* (2006.01)

(52) U.S. Cl.
CPC .......... *B60R 25/24* (2013.01); *G07C 9/00023* (2013.01); *G07C 9/00309* (2013.01)

(58) Field of Classification Search
CPC ................ B60R 25/24; G07C 9/00023; G07C 9/00309; G07C 9/00007; G07C 9/00722; E05B 35/00; E05B 47/0038; E05B 47/0045; E05B 47/0043; E05B 47/0044; E05B 73/0052
See application file for complete search history.

(56) References Cited

U.S. PATENT DOCUMENTS

| | | | |
|---|---|---|---|
| 8,831,224 B2 | 9/2014 | Bai et al. | |
| 2008/0024270 A1* | 1/2008 | Katagiri | B60R 25/04 340/5.72 |
| 2011/0197844 A1* | 8/2011 | Matsubara | B60R 25/00 123/179.2 |
| 2013/0099892 A1* | 4/2013 | Tucker | G07C 9/00309 340/5.61 |
| 2013/0226399 A1* | 8/2013 | Miller | B60R 25/20 701/36 |
| 2013/0297194 A1* | 11/2013 | Wisnia | F02N 99/00 701/113 |
| 2013/0332736 A1* | 12/2013 | Kawamura | H04L 9/0869 713/171 |
| 2014/0070917 A1* | 3/2014 | Protopapas | B60R 25/25 340/3.1 |
| 2014/0091903 A1 | 4/2014 | Birkel et al. | |
| 2014/0240086 A1* | 8/2014 | Van Wiemeersch | B60R 25/25 340/5.51 |
| 2016/0055699 A1* | 2/2016 | Vincenti | G07C 9/00309 340/5.61 |
| 2016/0318475 A1* | 11/2016 | Honkanen | G07C 9/00182 |
| 2016/0344747 A1* | 11/2016 | Link, II | H04L 63/123 |

* cited by examiner

*Primary Examiner* — Hirdepal Singh
(74) *Attorney, Agent, or Firm* — Frank Lollo; Brooks Kushman P.C.

(57) ABSTRACT

A system includes a processor configured to receive a request from a mobile device to utilize a vehicle resource. The processor is also configured to determine that a first key has been used to start a vehicle a first time. The processor is further configured to determine that a second key has been used to start the vehicle a second time and approve the request based on the determination that both the first key and the second key were used to start the vehicle a first time and a second time respectively.

15 Claims, 3 Drawing Sheets

METHOD AND APPARATUS FOR SECURE PAIRING

TECHNICAL FIELD

The illustrative embodiments generally relate to a method and apparatus for secure pairing.

BACKGROUND

Utilization of mobile applications for various smartphone platforms, as well as mobile applications used to communicate with and control vehicle functions is a rapidly growing customer demand within the automotive field. Because vehicles have been provided with the capability to interface with, receive commands from, and grant control of functions to a smartphone, security measures must be taken to prevent unauthorized access to the vehicle via a smartphone or other mobile device. Previous solutions have included direct on-screen access via a vehicle screen to pair a device, but this can permit a limited-time user (someone who borrows the vehicle, for example) to pair to the vehicle. Another previous option included some form of time delay following a request for verification purposes and to prevent immediate access to a party for whom access may not be desired. This can be onerous, however.

In another illustrative existing example, systems and methods may provide for determining a first proximity status of a first mobile device with respect to a vehicle, and determining a second proximity status of a second mobile device with respect to the vehicle. Additionally, an accessibility of one or more functions of the vehicle may be configured based at least in part on the first proximity status and the second proximity status. In one example, a policy associated with one or more of the first mobile device and the second mobile device may be identified, wherein the accessibility is configured further based on the policy.

SUMMARY

In a first illustrative embodiment, a system includes a processor configured to receive a request from a mobile device to utilize a vehicle resource. The processor is also configured to determine that a first key has been used to start a vehicle a first time and a second key has been used to start the vehicle a second time and approve the request if both the first key and the second key were used to start the vehicle the first time and the second time, respectively.

In a second illustrative embodiment, a computer-implemented method includes providing access to a vehicle resource by a vehicle processor in response to a request received by the vehicle processor from a mobile device if the vehicle has previously been started using a first key a first time and using a second key a second time, and if the first and second times meet predetermined criteria.

In a third illustrative embodiment, a system includes a mobile device processor configured to transmit a request to a vehicle processor to utilize a vehicle resource. The mobile device processor is further configured to receive authorization to access the vehicle resource from the vehicle processor based on the vehicle previously being started with a first key a first time and a second key a second time, the first and second times meeting a predetermined vehicle criteria.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
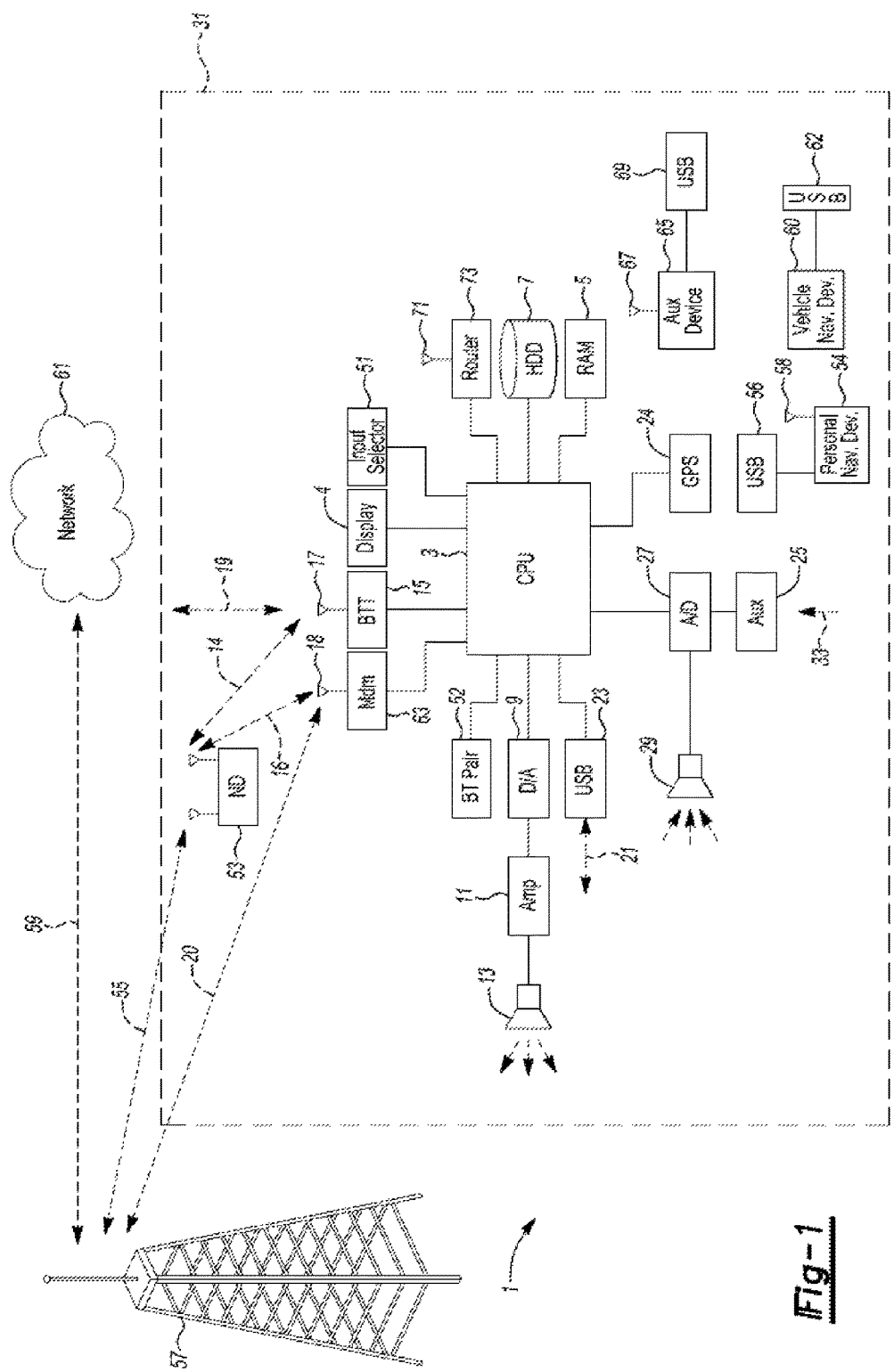
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionally with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

As previously noted, many present solutions for pairing a device/application/account to a vehicle leave something to be desired. Pairing through a vehicle interface may be convenient, but it may allow an unintended user to pair with a vehicle and gain control functionality. Pairing that requires a lengthy time-delay can both irritate authorized users and limit functionality for those users during the time delay. With the combination of vehicle feature control through smartphones and the increasingly common trend of temporarily renting vehicles or sharing a vehicle, an efficient way to pair a device or authorize an application to control a vehicle function is desirable.

In the illustrative embodiments, the presence of multiple authorized vehicle keys, in conjunction with a pairing request, allows pairing of a smart phone or authorization of an application. Since presumably only a vehicle owner or authorized requestor will have access to more than one key, this can provide an efficient mechanism for verifying a request, while at the same time limiting the request to those parties most likely to be authorized to make the request.

Figure 2:
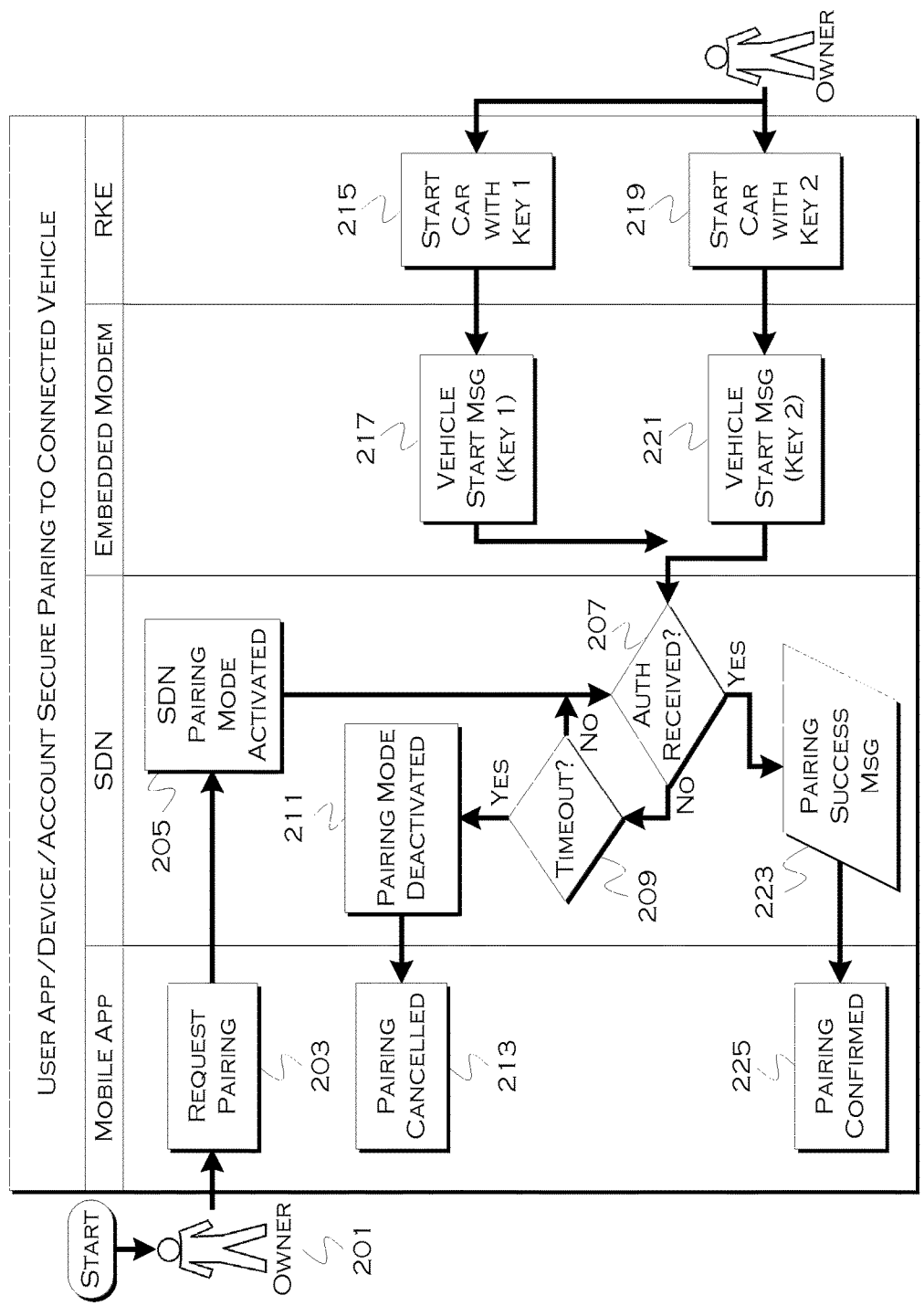
FIG. 2 shows the flow of an illustrative device or application pairing.

FIG. 2 shows the flow of an illustrative device or application pairing. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, there are four acting entities involved in the pairing. Specifically, these are a mobile application requesting authorization or device requesting pairing, a service delivery network (SDN), an embedded modem and a remote keyless entry system (or other vehicle keys). Here, the owner 201 is requesting authorization for a mobile application to receive approval to control a vehicle function. Additionally or alternatively, a mobile device pairing request could be initiated. The owner first utilizes the mobile device (here an application on the device) to request pairing 203. The request is sent to the SDN, where a pairing mode is activated based on the request 205. In this example, the pairing mode then looks for the presence of two different keys used to start the vehicle 207, which indicates a high likelihood of an owner starting the vehicle in conjunction with the pairing request.

The owner, subsequent to requesting the pairing, can utilize a first key to start the vehicle 215. This results in a message that a first key was used to start the vehicle 217. Then, when this process is complete, the owner can power down the vehicle and use a second key to start the vehicle 219. This results in a message that a second key was used to start the vehicle 221. In some cases, remote users may be provided with temporary keys to a vehicle (e.g., digital keys or codes), because of this, the "used a key to start the vehicle" indicia may require that an original OEM issued key be used to start the vehicle, as opposed to a digital one. This could be used to prevent a party with two different temporary digital keys from improperly pairing an application or device.

Provided that both keys are used to start the vehicle and both indicia of successful startups are sent prior to a timeout 209, the pairing will be successful and a success message may result 223. Pairing can then be confirmed on the mobile device or at the application requesting the pairing 225. The timeout can be used to help prevent inadvertent pairing, such as if one key were used a first day and another key were used a second day. An appropriately short window can be applied to the timeout such that the multiple-key startups are done intentionally within the window. Lapsing of the time window can cause the pairing process to exit 211 and cancel the pairing of the device 213.

Figure 3:
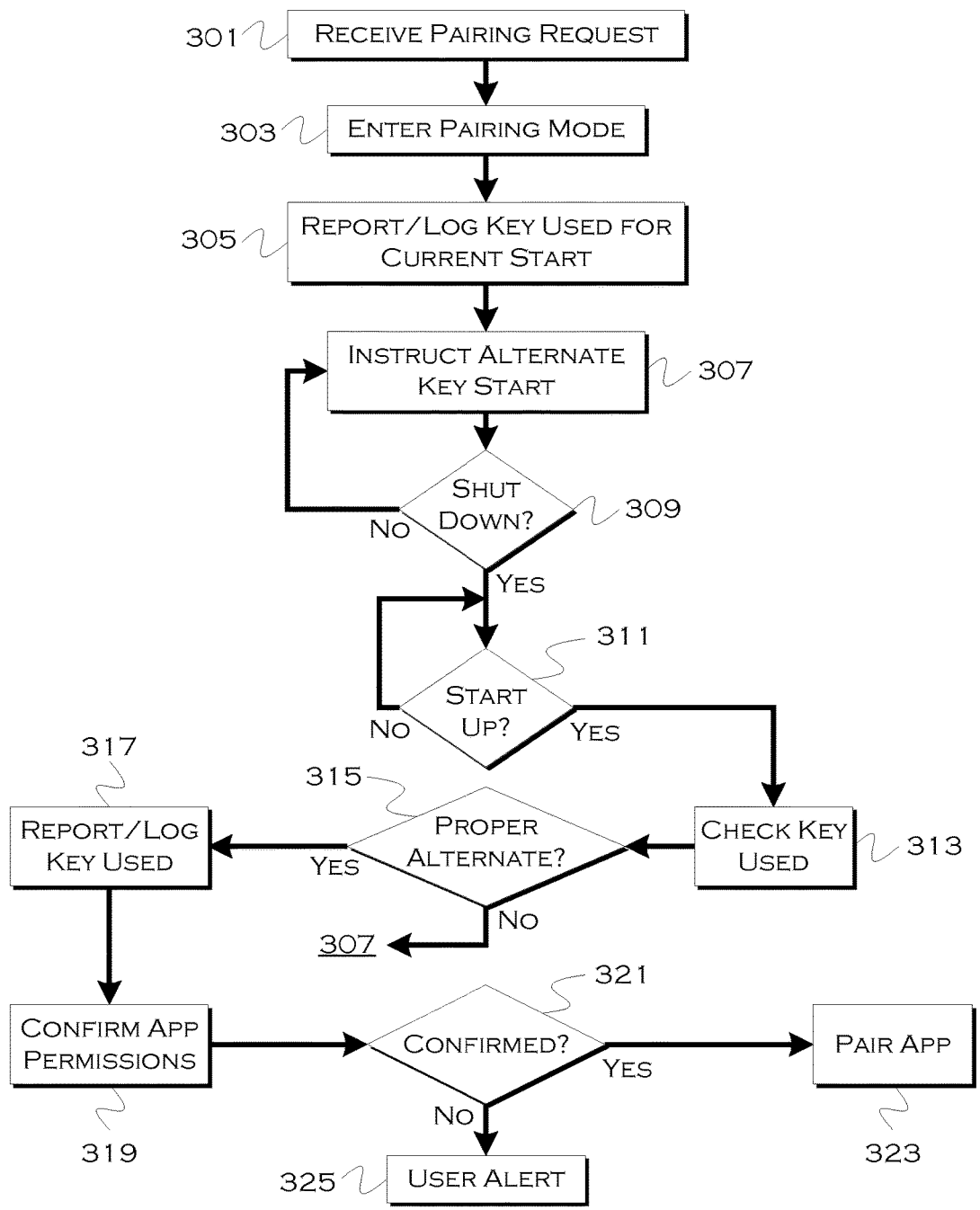
FIG. 3 shows an illustrative pairing process.

FIG. 3 shows an illustrative pairing process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This is an example of a vehicle or cloud-based process that can run to determine if the pairing request and required follow-up (in this example, the two key start process) has been performed in the appropriate time period.

The process receives a pairing request 301. This could be a request sent to the vehicle directly, or a request sent to the cloud for authorization of a device, application, or user account (e.g., without limitation, a request to utilize vehicle functionality using the device, application or account). The process then enters a pairing mode 303, which starts a timeout clock in this example and begins to look for utilization of a first key to start the vehicle 305. It is also possible, for example, that the vehicle has already been started with a particular key, and that this process will log or report the utilization of the first key based on a startup prior to the pairing request.

If, for example, the vehicle were not yet started, the mobile device could communicate requests with a backend network, which could receive startup information from a vehicle and send instructions to the mobile device to facilitate the pairing/request approval. This avoids direct communication between the vehicle and device, although the process described herein could also be run on a vehicle and facilitated through direct communication between the vehicle and the device.

In this example, so that the user knows the protocol for pairing, the process then instructs the user to re-start the vehicle using a different key 307. This instruction persists, in this example, until the vehicle is powered down 309. Once the vehicle is powered down and restarted 311, the process can check to see if a different key is used 313. An instruction to start the vehicle twice with two different keys can be sent to a requesting mobile device or application for display, or can be displayed on a vehicle interface. Depending on whether a particular implementation requires dual start up following a request, or "counts" the first start up prior to a request as the first of the two startups, the process can issue a tailored instruction.

If the key used to start the vehicle for a second time is an appropriate alternate key 315, the process can report the second key usage to start the vehicle 317 (or log the usage, if approval is all local to the process). At any point during this process, if the timeout expires, the process can exit.

Once the second key has been approved and recorded or reported, the process can confirm the permissions for the original request 319. This may require secondary approval from a remote source, depending on the level of access requested. Also, if a backend is involved, the backend may verify that both keys used were keys that correspond to permissible keys for pairing purposes. The use of the two keys can confirm the presence of an authorized user, but the requesting device or application may require additional approval (to ensure, for example, that the manufacturer has approved the device or application for usage in the requested manner, to avoid errors or malfunctions). Once confirmation of the requested permission is received 321, the process can pair the application 323 (or otherwise provide the requested resources/functionality/control). Otherwise, the process may alert the user that an error has occurred 325, which, in this case, likely results from an improper requesting application or device, because at this point both keys have been properly utilized to start the vehicle. Vehicle resources include, but are not limited to, control of vehicle systems, use of vehicle inputs/outputs and gathering data from vehicle systems.

Through use of the multiple key startup system described herein, quick pairing can be obtained in a manner that should be relatively simple for an authorized vehicle owner or user that has access to all keys. Improper pairing can be avoided, and the authorized user can proceed in a fairly simple manner when a proper request is sent.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
   a processor configured to:
      receive a request from a mobile device to utilize a vehicle resource and responsively generate a user-instruction to start a vehicle using a first key immediately followed by starting the vehicle using a second key;
      determine compliance with the generated user-instruction; and
      approve the request if both the first key and the second key were used to start the vehicle the first time and the second time, respectively.

2. The system of claim 1, wherein the user-instruction is sent to the mobile device for display.

3. The system of claim 1, wherein the user-instruction is displayed on a vehicle interface.

4. The system of claim 1, wherein the request includes a pairing request.

5. The system of claim 1, wherein the request includes a request to control a vehicle function.

6. The system of claim 1, wherein the request includes a request to utilize a vehicle resource.

7. A computer-implemented method comprising:
   in response to a request received by a vehicle processor from a mobile device, generating an instruction for a user to start a vehicle first using a first key and then again using a second key; and
   providing access to a vehicle resource by the vehicle processor if the vehicle has been started in accordance with the instruction, and if the first and second starts meet predetermined criteria.

8. The method of claim 7, the predetermined criteria comprising:
   determining that the first key and second key were used to start the vehicle within a predetermined time window.

9. The method of claim 7, further comprising storing an identifier and starting time associated with the first key and an identifier and a starting time associated with the second key when the first key and the second key are used to start the vehicle, respectively, the identifiers transmitted by the vehicle and received by a computer remote from the vehicle.

10. A system comprising:
    a mobile device processor configured to:
    transmit a request to a vehicle processor to utilize a vehicle resource;
    control a user interface to display instructions for starting a vehicle a first time using a first key and a second time using a second key; and
    receive authorization to access the vehicle resource from the vehicle processor based on the vehicle previously being started with the first key the first time and the second key the second time, the first and second times meeting a predetermined vehicle criteria.

11. The system of claim 10 wherein the mobile device processor communicates with a server remote from the vehicle to receive authorization.

12. The system of claim 10, wherein the predetermined vehicle criteria includes the first time and second time both being within a predefined time window.

13. The system of claim 10, the vehicle resource including control of a vehicle system via the mobile device.

14. The system of claim 10, the vehicle resource including utilization of a vehicle input or output.

15. The system of claim 10, the vehicle resource including requesting information from a vehicle system.

* * * * *